United States Patent [19] [11] 4,272,427
Davis et al. [45] Jun. 9, 1981

[54] PLASTICIZED PVC

[75] Inventors: Boyce I. D. Davis, Cheadle; Brian G. Clubley, Wilmslow, both of England

[73] Assignee: Ciba-Geigy AG, Basel, Switzerland

[21] Appl. No.: 94,305

[22] Filed: Nov. 13, 1979

[30] Foreign Application Priority Data

Nov. 15, 1978 [GB] United Kingdom ............... 44635/78

[51] Int. Cl.³ ................................................. C08K 5/49
[52] U.S. Cl. ......................... 260/30.6 R; 260/23 XA; 260/42.49; 260/45.7 PH; 260/45.75 R
[58] Field of Search ............ 260/396 R, 23, 45.7 PH, 260/45.75 R, 42.49

[56] References Cited

U.S. PATENT DOCUMENTS

| 2,407,668 | 5/1945 | Leatherman | 260/30.6 R |
|---|---|---|---|
| 3,723,139 | 3/1973 | Larkin et al. | 260/45.75 B |
| 3,821,151 | 6/1974 | Mitchell | 260/30.6 R |
| 3,869,420 | 3/1975 | Mathis et al. | 260/30.6 R |
| 4,129,535 | 12/1978 | Elcik | 260/30.6 R |

FOREIGN PATENT DOCUMENTS 2398775 3/1979 France ............................... 260/30.6 R

*Primary Examiner*—William F. Hamrock
*Attorney, Agent, or Firm*—Wenderoth, Lind & Ponack

[57] ABSTRACT

Fire retardant PVC composition comprising a vinyl chloride polymer or co-polymer, a tri-aryl phosphate and a smoke suppressant which is a mixture of magnesium carbonate and zinc carbonate.

5 Claims, No Drawings

PLASTICIZED PVC

The present invention relates to plasticised vinylchloride polymer and copolymer compositions containing a flame retardant plasticiser and smoke suppressant additive. Polyvinyl chloride (PVC) is a polymer in extensive commercial use which is generally regarded as possessing inherently good flame retardant properties. However, when a flexible PVC composition is required, it is necessary to add a plasticiser, and many plasticisers such as carboxylate esters are flammable and reduce the flame retardance of the PVC composition considerably. This disadvantage may be offset to some extent by the use of a flame retardant additive such as antimony oxide in conjunction with the flammable plasticiser. In many cases, however, a more effective solution is to use a flame retardant plasticiser in particular a tri-aryl phosphate or mixture of tri-aryl phosphates.

As well as the problem of flammability plastic materials such as plasticised PVC have an added hazard in that they produce large volumes of smoke on burning. Studies of fires in recent years has lead to the belief that, in terms of fire fatalities, the smoke produced from burning plastics may be regarded as a hazard equal in importance to that of flammability.

It is the object of this invention to provide a plasticised PVC composition which possesses the efficient flame retardance imparted by a tri-aryl phosphate plasticiser together with an additive which reduces smoke produced on burning.

Smoke suppressant additives for plasticised PVC have been described previously. For example, magnesium compounds, zinc compounds (BP 1,490,233) and mixtures of magnesium and zinc oxides (NL 7711-326) have been described. B.P. 1490233 describes the use of, inter alia, zinc carbonate as a smoke suppressant for plasticised PVC.

We have found that particularly effective smoke suppressants are mixtures of magnesium carbonate and zinc carbonate. As well as possessing excellent activity as smoke suppressants these mixtures show other advantages over previously disclosed additives in that they improve the flame retardance and heat stability of tri-aryl phosphate plasticised formulations containing them. Another advantage of the mixtures of this invention is that they give flame retardant compositions which may be of good clarity.

In particular, we have found that a mixture of magnesium carbonate and zinc carbonate is superior to an equivalent amount of magnesium carbonate as a smoke suppressant for phosphate plasticised PVC. Moreover, the smoke suppressant activity of a mixture of magnesium carbonate and zinc carbonate is not only at least as good as or superior to an equivalent amount of zinc carbonate in phosphate plasticised PVC but the heat stability is significantly better.

Accordingly the present invention provides a composition comprising a plasticised vinyl chloride polymer or co-polymer and
(a) a tri-aryl phosphate ester and
(b) a mixture of magnesium carbonate and zinc carbonate.

Tri-aryl phosphate esters are preferably those with same or different aryl radicals, especially optionally alkylated phenyl radicals, of which at least one phenyl radical is alkylated by alkyl with preferably 1 to 4 carbon atoms, like methyl, isopropyl, sec.-butyl or tert.-butyl.

Examples of tri-aryl phosphate esters which may be employed are:
cresyl diphenyl phosphate
phenyl xylyl phosphate
tri-tolyl phosphate
tri-xylyl phosphate
phenyl/isopropylated phenylphosphates (for example those sold under the Trade Name Reofos 95, 65 and 50 and prepared as described in U.K. patent specification No. 1,146,173)
phenyl/sec. butyl phenyl phosphates
phenyl/p-t-butyl phenyl phosphates,
or mixtures thereof.

The phosphate ester may be present in any amount, conveniently from 1 to 150 parts and preferably from 2 to 90 parts by weight per 100 parts by weight of vinyl chloride polymer or copolymer.

The magnesium carbonate and zinc carbonate may be mixed by conventional methods, for example, in a dry blender.

The ratio of magnesium carbonate to zinc carbonate in the smoke suppressant mixture may vary from 100:1 to 1:10, conveniently from 10:1 to 1:10 but preferably from 10:1 to 1:5. An especially preferred mixture contains the magnesium carbonate and zinc carbonate in a ratio of from 5:1 to 2:1, for example 4:1 to 2:1.

Any commercial grade of magnesium or zinc carbonate may be used, and this may conveniently be either the light or the heavy carbonate. If desired, calcium carbonate may be present in the mixture and an especially preferred form of magnesium carbonate is dolomite.

Non-limiting examples of smoke suppressant mixtures of this invention are:
light basic magnesium carbonate and basic zinc carbonate;
heavy basic magnesium carbonate and basic zinc carbonate; dolomite and basic zinc carbonate.

Other magnesium and zinc compounds may also be added to mixtures of the invention to give smoke suppressant mixtures such as:
heavy basic magnesium carbonate, magnesium oxide and basic zinc carbonate,
dolomite, magnesium hydroxide and basic zinc carbonate,
light basic magnesium carbonate, magnesium oxide, basic zinc carbonate and zinc oxide.

The mixture of magnesium carbonate and zinc carbonate may be incorporated into the vinyl chloride polymer or copolymer in any amount, depending on the end use, conveniently from 1 to 120 parts for example from 2 to 80 parts by weight per hundred parts by weight of resin. If it is desirable to improve the dispersant properties of the smoke suppressant mixture in the vinyl chloride polymer or co-polymer, this may be achieved by damping with a small amount of plasticiser and/or surfactant before adding to the vinyl chloride polymer or copolymer.

Accordingly, the present invention also provides a powder composition comprising a mixture of magnesium carbonate and zinc carbonate damped with a small amount of plasticiser or surfactant or a mixture of both. The amount of plasticiser and/or surfactant may be present in such quantity that the powder form is maintained and may be, for example, from 10 to 50 parts, preferably 20 to 30 parts by weight per 100 parts by weight of the $MgCO_3/ZnCO_3$ mixture. Such a composition may then be incorporated into a vinyl chloride polymer or co-polymer pre-mix, such as a plastisol or dry blend.

Alternatively, however, to assist dispersion a paste may be made of the smoke suppressant mixture utilising a larger amount of plasticiser which may be in the ratio of 2:1 to 1:1 of plasticiser to the dry component mixture.

Other methods of improving the dispersant properties of the smoke suppressant entail the use of a surfactant coating or change of the crystal habit, for example, to spherical particles.

The tri-aryl phosphate ester (a) and the mixture (b) may be incorporated into the PVC by any of the known methods of compounding.

The compositions of the present invention may also contain other conventional ingredients such as heat stabilisers, light stabilisers, ultra-violet light absorbers, anti-oxidants, fillers, pigments, lubricants, blowing agents, fungicides, extenders, processing aids, other fire retardant additives and plasticisers, carboxylate ester plasticisers and other smoke suppressants, Examples of heat and light stabilisers are as follows:
(1) Salts of inorganic or organic acids containing metals such as aluminium, barium, bismuth, calcium, cadmium, potassium, sodium, lead, antimony, tin, strontium or any metal which is capable of exerting a stabilising effect on PVC in salt form. The salts may be simple or complex.

Examples of inorganic salts are basic lead carbonate and tribasic lead sulphate.

Organic acids which may be used are:
(a) Aliphatic carboxylic acids, straight or branched chain unsaturated or saturated, and optionally containing hydroxyl substituents or oxygen in epoxy groups. Examples of salts of these are zinc 2-ethyl hexanoate and barium laurate.
(b) Aromatic mono- or di-carboxylic acids containing any type of substitution in the aromatic groups and any type of alkyl/aryl configuration.

Examples of salts are cadmium p-tertiary butyl benzoate, calcium benzoate or lead salicylate.
(c) As acidic materials, phenols capable of forming stable compounds (phenates) with metals whether in a suitable solution or not.

An example of such a salt is barium nonyl phenate.
(2) Organo-metallic compounds of either of the following metals, antimony or tin.

Examples of such compounds are dialkyl tin mercaptides and dialkyl tin carboxylates.
(3) Organic compounds of any description which prevent degradation of PVC.

Among these are α-phenyl indole or esters of amino crotonic acid.

All these compounds may be used alone or as mixtures with each other either as solids or as solutions in any suitable solvent not necessarily being a stabiliser. Combinations which may be used are of calcium and zinc carboxylates or of a barium phenate with the cadmium salt of a branched chain fatty acid or of barium, cadmium and zinc carboxylates.

There may be used with the foregoing stabilisers, materials which enhance the effectiveness of the stabilisers but which are not stabilisers for PVC when used alone. These are referred to as co-stabilisers and include
(a) Epoxidised oils and esters such as epoxidised soya bean oil or epoxidised octyl oleate.
(b) Esters of phosphorous acid which may be trialkyl, triaryl or alkyl-aryl. For example triphenyl phosphite, tris (nonyl phenyl) phosphite or diphenyl isodecylphosphite.
(c) Aliphatic hydrophilic compounds such as pentaerythritol, neopentyl glycol, sorbitol or partial esters of glycerol.
(d) Phenolic compounds such as 2:6-di-tert-butyl-4-methyl phenol or 2:2 bis (4'-hydroxy phenyl) propane.

These co-stabilisers can be used singly or together with the main stabiliser in any proportions and combinations. They may be applied in their natural state, alone or in mixtures of stabilisers, or in solvent solutions, alone or in admixture with the stabilisers, using suitable solvents which are not necessarily PVC stabilisers.

Examples of lubricants are polyethylene waxes, ester waxes, stearic acid, calcium stearate, lead stearate and examples of fillers are calcium carbonate ground or precipitated or china clays or alumina trihydrate.

Examples of materials which absorb ultra-violet light, making the PVC compound more stable to light exposure, are benzophenones or benzotriazoles. Examples of other fire-retardant additives are, aluminium trihydrate, antimony oxide and organo bromine containing compounds.

Examples of other known plasticisers are:
(a) Phthalate esters
(b) Low temperature plasticisers such as adipate, sebacate, and azelate esters.
(c) Conventional polyester plasticisers such as poly (1:3 butylene glycol adipate) end-stopped with a $C_8$ alcohol or other typical members of this class.
(d) Other phosphate ester plasticisers such as tri-alkyl phosphates e.g. tri-octyl phosphate, and alkyl aryl phosphates e.g. diphenyl decyl phosphate and diphenyl octyl phosphate.
(e) Aryl esters of alkane sulphonic acids Examples of extenders are halogenated paraffins or aromatic hydrocarbons.

Examples of other smoke suppressants are other magnesium compounds and mixtures with other compounds such as zinc oxide and iron compounds e.g. ferrocene.

The present invention also provides articles of manufacture made from the vinyl chloride polymer or co-polymer compositions hereinbefore described.

The following Examples further illustrate the invention in which parts and percentages are expressed by weight.

EXAMPLES 1 TO 3 AND COMPARATIVE EXAMPLES A AND B

PVC compositions were prepared according to the formulations given in Table 1 by milling for 10 minutes at 165° C. and compression moulding at 175° C.

TABLE I

| Additive | Parts |
|---|---|
| PVC PEVIKON P702 | 100 |
| Reofos 50 | 15 |
| Cereclor S45 | 15 |
| DiDP | 25 |
| Calibrite | 30 |
| TiO₂ | 10 |
| Irgastab BC 206 | 2 |
| Smoke Suppressant | 10 |

DiDP = Di Decyl Phthalate
"Reofos" and "Irgastab" are Registered Trade Marks

The smoke emission of the PVC compositions described was determined by the use of an NBS Aminco smoke density cabinet. 0.015 inch thick samples of each composition were tested in the flaming mode and the values of maximum specific optical density shown are the means of three replicates. Lower Dmax values indicate a lower emission of smoke.

The flame retardant activity of the PVC compositions was determined by measurement of the Oxygen Index (Test OI ASTM 2863).

The results are shown in Table II, in which it can be seen that in addition to the excellent smoke suppressant activity, the flame retardance of a mixture of $MgCO_3$ and $ZnCO_3$ is significantly better than that of a commercial smoke suppressant Ongard 2.

TABLE II

| Example | Smoke Suppressant Additive | Smoke Density D max | Oxygen Index (OI) |
|---|---|---|---|
| 1 | 7.7 parts $MgCO_3$(L) 2.3 parts $ZnCO_3$ | 158 | 33.4 |
| 2 | 7.7 parts $MgCO_3$(H) 2.3 parts $ZnCO_3$ | 164 | 31.3 |
| 3 | 8.40 parts Dolomite 0.85 parts light magnesium hydroxide 0.75 parts basic zinc carbonate | 154 | 28.8 |
| A | Commercial smoke suppressant Ongard 2 | 132 | 26.7 |
| B | None | 206 | 27.7 |

EXAMPLE 4

25 parts of Reofos 50 were stirred with 75 parts of a mixture of 7.7 parts magnesium carbonate and 2.3 parts of zinc carbonate to give a free flowing powder.

EXAMPLES 5 AND 6 AND COMPARATIVE EXAMPLES C AND D

PVC compositions were prepared according to the formulations given in Table I by milling for 10 minutes at 165° C. and compression moulding at 175° C.

The smoke emission of the PVC compositions was determined by the method described in Examples 1 to 3.

The heat stabilities of the PVC compositions were determined by placing several samples of each formulation on a glass plate in a rotating shelf oven at 180° C. and removing them after intervals of either 5 or 15 minutes until blackening occurs. The time taken to blackening indicates their relative stabilities.

The results are shown in Table III in which it can be seen that the smoke suppressant activity of a mixture of $MgCO_3$ and $ZnCO_3$ is significantly superior to that of an equivalent amount of $MgCO_3$ alone. Moreover the smoke suppressant activity of a mixture of $MgCO_3$ and $ZnCO_3$ is not only comparable to that of an equivalent amount of $ZnCO_3$ alone but the heat stability of phosphate plasticised PVC compositions containing a mixture of $MgCO_3$ and $ZnCO_3$ is significantly better than that of phosphate plasticised PVC compositions containing an equivalent amount of $ZnCO_3$ alone.

TABLE III

| Example | Smoke Suppressant Additive | Smoke Density D max | Heat stability time taken to blackening |
|---|---|---|---|
| 5 | 7.7 parts $MgCO_3$(L) 2.3 parts $ZnCO_3$ | 158 | >130 mins |
| 6 | 8.40 parts Dolomite 0.85 parts light magnesium hydroxide. 0.75 parts basic zinc carbonate | 154 | >130 mins |
| C | $ZnCO_3$ | 154 | 20 mins |
| D | $MgCO_3$(L) | 173 | >130 mins |

EXAMPLE 7 AND COMPARATIVE EXAMPLES E, F AND G

PVC compositions containing only Reofos 95 as plasticiser were prepared according to the formulations given in Table IV by milling for 10 minutes at 165° C. and compression moulding at 175° C.

TABLE IV

| Additive | parts |
|---|---|
| Breon S 125/12 | 100 |
| Reofos 95 | 70 |
| Smoke suppressant | 10 |
| Irgastab 17 M | 1 |

The smoke emission of the PVC compositions was determined by the method described for Examples 1 to 3. The results are given in Table V.

TABLE V

| Example | Smoke Suppressant Additive | Smoke Density Dmax |
|---|---|---|
| 7 | 8 parts $MgCO_3$ 2 parts $ZnCO_3$ | 339 |
| E | 10 parts $ZnCO_3$ | 364 |
| F | 10 parts $MgCO_3$ | 372 |
| G | None | 440 |

The above results show that the additive of Example 7 according to the present invention is an excellent smoke suppressant and has superior activity to either $ZnCO_3$ or $MgCO_3$ alone.

What we claim is:

1. A composition comprising a vinyl chloride polymer or copolymer and
    (a) from 1 to 150 parts by weight, per 100 parts by weight of the vinyl chloride polymer or copolymer, of a triaryl phosphate ester, and
    (b) from 1 to 120 parts by weight per 100 parts by weight of vinyl chloride polymer or copolymer of a mixture of magnesium carbonate and zinc carbonate in which the ratio of magnesium carbonate to zinc carbonate is from 10:1 to 1:10.
2. A composition as claimed in claim 1, in which the ratio of magnesium carbonate to zinc carbonate is from 4:1 to 2:1.
3. A composition as claimed in claim 1, in which component (b) is a mixture of light or heavy basic magnesium carbonate and basic zinc carbonate.
4. A composition as claimed in claim 1, in which calcium carbonate is present in component (b).
5. A composition as claimed in claim 1 in which component (b) is a mixture of dolomite, basic zinc carbonate and magnesium hydroxide.